No. 807,922. PATENTED DEC. 19, 1905.
B. D. GILSON.
ADJUSTABLE VEHICLE WHEEL.
APPLICATION FILED MAR. 18, 1905.
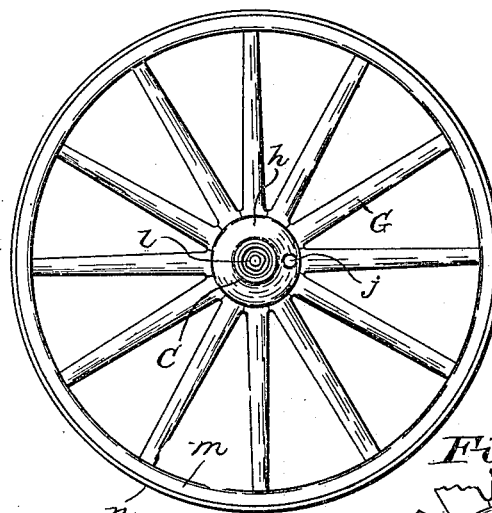
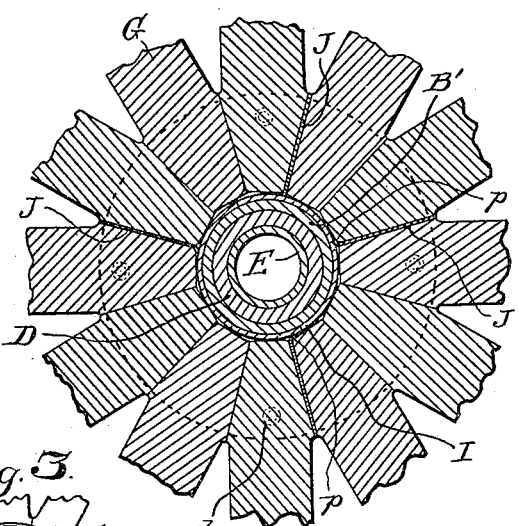
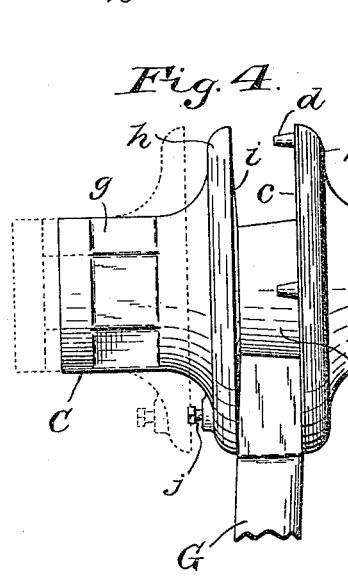
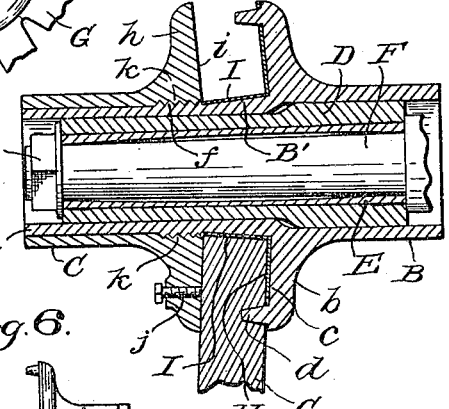
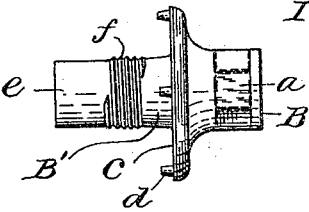
Witnesses:
E. R. Martin.
Stella Snider.
Inventor:
Bert Dell Gilson,
by E. T. Silvius.
Attorney.

UNITED STATES PATENT OFFICE.

BERT DELL GILSON, OF INDIANAPOLIS, INDIANA, ASSIGNOR OF ONE-HALF TO LEON MAYMON, OF INDIANAPOLIS, INDIANA.

ADJUSTABLE VEHICLE-WHEEL.

No. 807,922.     Specification of Letters Patent.     Patented Dec. 19, 1905.

Application filed March 18, 1905. Serial No. 250,766.

*To all whom it may concern:*

Be it known that I, BERT DELL GILSON, a citizen of the United States, residing at Indianapolis, in the county of Marion and State of Indiana, have invented new and useful Improvements in Adjustable Vehicle-Wheels; and I do declare the following to be a full, clear, and exact description of the invention, reference being had to the accompanying drawings, and to the letters of reference marked thereon, which form a part of this specification.

This invention relates to the class of wheels that have wooden spokes inserted in the hubs thereof, and it has reference particularly to the hubs and spokes of the wheels.

The objects of the invention are to provide a hub construction that will facilitate the work in tightening tires and also in replacing broken spokes with new ones and to provide a hub in which the spokes may be tightened after shrinkage thereof takes place, also to provide a durable and economical metallic hub that will not be noisy in use.

With the above-mentioned and other objects in view the invention consists of a hub comprising certain novel parts having peculiar forms; and it consists, further, in the combinations and arrangements of parts, as hereinafter particularly described and claimed.

Referring to the drawings, Figure 1 is an elevation of the front or outer side of a wheel constructed according to the invention; Fig. 2, a fragmentary sectional view of the wheel transversely of the hub on the plane midway between the inner and outer sides of the spokes; Fig. 3, an elevation of the outer end of the improved hub; Fig. 4, a side elevation of the hub and a fragment of a spoke therein; Fig. 5, a longitudinal sectional view of the hub, as on the line A A in Fig. 3, including only one of the spokes; Fig. 6, a side elevation of one of the main parts of the hub.

Similar reference characters in the drawings designate like parts or features.

In a practical embodiment of the invention a rear part B comprises the foundation of the hub, the rear end portion of which has facets formed exteriorly, as a hexagonal nut $a$, to which wrenches may be applied, and near the nut the rear part has a flange $b$, the face $c$ of which for assisting in holding the spokes is dished, so as to produce a dished form of wheel; but when a dished wheel is not desired the face obviously will be straight. The flange is provided with a suitable number of studs $d$, projecting from the face $c$, for preventing the hub from moving rotatively with respect to the spokes while in use in case the spokes should be slightly loose in their bearings, particularly when the wheel may be driven by application of a vehicle-motor to the hub. The studs enter recesses in the spokes that obviously are greater in diameter than the studs in order to permit the spokes to be moved radially and also laterally when readjusting them. Obviously, however, the studs may extend between the spokes, where they are separated beyond the flange. In many cases the studs may be omitted, if so desired. Adjacent to and projecting beyond the base of the flange is a conical bearing B' for the spokes, formed as an integral portion of the part B, and beyond the bearing extends an integral forward end $e$ of the part B, having external screw-threads $f$ near the bearing B'.

On the end E is an adjustable front part C of the hub and having a part thereof on which are facets and formed as a hexagonal nut $g$, also provided with a flange $h$, opposing the flange $b$, the face $i$ of the flange being parallel to the face $c$ of the flange $b$. A locking-screw $j$ is mounted in the flange $h$ and extends therethrough, so as to engage any of the spokes of the wheel. The part C is provided with internal screw-threads $k$, engaging the threads $f$, and fits movably on the end $e$ of the part B.

Within the part B of the hub is a thimble D, composed of such material as wood or vulcanized fiber, and suitably secured therein and within the thimble a suitable journal-box E is secured thereto and corresponds to an axle F, having a nut $l$ for retaining the hub thereon. Various other types of axles and bearings, however, may obviously be employed in the hub.

The spokes G are placed against the bearing B' and against the flange $b$, the spokes having suitable recesses that receive the studs $d$, and the flange $h$ is forced tightly against the spokes, after which the screw $j$ is forced against an opposite spoke to prevent the front part C and flange $h$ from accidentally working loose when in use. The felly $m$ is attached to the spokes in the usual manner, and the tire $n$ is placed about the felly. Various types of tires may be obviously employed to suit requirements.

In order to provide for adjustment or readjustment of pressures between the hub and the tire, which may be required on account of either swelling or shrinking of the felly, a liner H extends about the bearing B' as a removable false front of the flange $b$, and the backs of the spokes G bear directly against the liner. Several liners of different thicknesses will be furnished, so that either one may be inserted in place of another. If a thick liner be removed and a thin one inserted, the flange $h$ will force the spokes onto the thicker part of the conical bearing and nearer to the flange $b$, thus spreading the spokes and the felly and tightening the tire. Also an annular liner I is placed about the bearing B', and the ends of the spokes bear directly against the liner. Several liners will be furnished, different in thickness, to suit requirements, so that in case a tire cannot be tightened after changing the liner H the liner I also may be changed. Also to compensate for swelling or shrinkage or to fill the spaces between spokes in the hub when the spokes may have been forced outwardly a suitable number of liners J are inserted between the spokes and between the flanges $b$ and $h$, these liners having their inner ends provided with hooks $p$, turned under corners of the inner ends of these spokes to hold the liners in place. Additional liners J may be inserted or some may be removed, as necessity requires.

It should be understood that the wheels may be constructed with due regard to requirements of service, road conditions, and atmospheric conditions. In some cases the liners H, I, and J may not be placed in new wheels, but may be furnished with them, so that they may be applied by the user when required. In some cases when the tire may be tight and the spokes loose in the hub the spokes may be tightened by means of the front part C and its flange $h$.

In view of the foregoing description the condition of the hub and tire will suggest the remedy that may be necessary, if any be indicated. When using a wrench on the nut $g$, another wrench should be applied to the nut $a$, so as to avoid straining the spokes if they be loose.

Additional spokes for each wheel may be kept on hand and quickly inserted in place of such as may be accidentally broken, thus avoiding delays and much expense for repairs.

In practical use the wheel will perform the usual service in the most satisfactory manner and, as will be seen, combines the advantages of wooden hubs, wooden hubs reinforced by metal, and metal hubs, with none of the disadvantages of either of those as heretofore constructed, since complete provision is made for all readjustments and also for the repairs most commonly required.

Having thus described the invention, what is claimed as new is—

1. In a wheel-hub, the combination of a foundation part having facets formed on the exterior of the rear end portion thereof; the exterior of the front end portion of the foundation part being straight with screw-threads thereon remote from the end thereof, there being a spoke-seat adjacent to the screw-threads, a flange attached integrally to the foundation part between the facets and the spoke-seat, a front part extending over the straight portion of the foundation part from the end thereof to the spoke-seat, there being screw-threads in the front part engaging the screw-threads of the foundation part, the front part having facets on the exterior thereof, a flange attached integrally to the front part, and a packing in the foundation part.

2. In a wheel-hub, the combination of an axle-box, a packing extending about the axle-box and from end to end thereof, a foundation part extending about the packing and beyond the ends thereof and having facets formed on the exterior thereof, the exterior of the front end portion of the foundation part being straight with screw-threads thereon remote from the end thereof, there being a spoke-seat adjacent to the screw-threads, a flange attached integrally to the foundation part between the spoke-seat and the facets thereof, studs attached to the flange, a front part extending over the straight portion of the foundation part from the end thereof to the spoke-seat, there being screw-threads in the front part engaging the screw-threads of the foundation part, the front part having facets on the exterior thereof, a flange attached integrally to the front part, and a set-screw extending through the flange of the front part.

3. In a wheel-hub, the combination of an axle-box, a packing extending about the axle-box and from end to end thereof, a foundation part extending about the packing and beyond the ends thereof and having facets formed on the exterior thereof, the exterior of the front end portion of the foundation part being straight with screw-threads thereon remote from the end thereof, there being a spoke-seat adjacent to the screw-threads, a flange attached integrally to the foundation part between the spoke-seat and the facets thereof, a front part extending over the straight portion of the foundation part from the end thereof to the spoke-seat, there being screw-threads in the front part engaging the screw-threads of the foundation part, the front part having facets on the exterior thereof, a flange attached integrally to the front part, and a set-screw extending through the flange of the front part.

4. In a wheel-hub, the combination of an axle-box, a packing extending about the axle-box and from end to end thereof, a foundation part extending about the packing and beyond the ends thereof and having facets formed on the exterior thereof, the exterior of the front end portion of the foundation part being straight with screw-threads thereon remote from the end thereof, there being a spoke-seat adjacent to the screw-threads, a flange attached integrally to the foundation part between the spoke-seat and the facets thereof, studs attached to the flange, a front part extending over the straight portion of the foundation part from the end thereof to the spoke-seat, there being screw-threads in the front part engaging the screw-threads of the foundation part, the front part having facets on the exterior thereof, and a flange attached integrally to the front part.

In testimony whereof I affix my signature in presence of two witnesses.

BERT DELL GILSON.

Witnesses:
WM. H. PAYNE,
E. T. SILVIUS.